US010605495B1

(12) United States Patent
Falls et al.

(10) Patent No.: US 10,605,495 B1
(45) Date of Patent: Mar. 31, 2020

(54) ELEGANTLY SIMPLE LOW-COST RETROFIT METHOD AND SYSTEM FOR REPLACING A CONSTANT TORQUE ELECTRONICALLY COMMUTATED MOTOR WITH A FIX-SPEED PERMANENT SPLIT CAPACITOR MOTOR

(71) Applicant: Mainstream Engineering Corporation, Rockledge, FL (US)

(72) Inventors: Luke Falls, Orlando, FL (US); Dana L. Elliot, Palm Bay, FL (US); Robert P. Scaringe, Rockledge, FL (US); David C. Hahn, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 217 days.

(21) Appl. No.: 15/044,616

(22) Filed: Feb. 16, 2016

(51) Int. Cl.
F24F 11/00 (2018.01)
F25B 13/00 (2006.01)
F25B 31/02 (2006.01)

(52) U.S. Cl.
CPC .......... *F25B 13/00* (2013.01); *F24F 11/0001* (2013.01); *F25B 31/026* (2013.01)

(58) Field of Classification Search
CPC .............. F24F 11/00; G05D 23/19; H02P 1/04
See application file for complete search history.

(56) References Cited

U.S. PATENT DOCUMENTS

| 4,648,551 | A |   | 3/1987 | Thompson et al. |
| 4,860,231 | A |   | 8/1989 | Ballard et al. |
| 5,303,561 | A |   | 4/1994 | Bahel et al. |
| 5,818,194 | A | * | 10/1998 | Nordby ............ F04D 27/004 318/105 |
| 6,282,910 | B1 |   | 9/2001 | Helt |
| 7,191,607 | B2 |   | 3/2007 | Curtis |
| 7,739,882 | B2 |   | 6/2010 | Evans et al. |
| 7,946,123 | B2 |   | 5/2011 | Tolbert, Jr. et al. |
| 8,493,008 | B2 |   | 7/2013 | Merkel et al. |
| 8,766,573 | B2 | * | 7/2014 | Becerra ............ F24F 11/006 236/51 |
| 8,917,045 | B2 | * | 12/2014 | Durfee ............ G06F 8/60 318/490 |
| 9,207,001 | B1 | * | 12/2015 | Roth ............ F25D 17/06 |
| 9,270,221 | B2 | * | 2/2016 | Zhao ............ H02P 25/04 |

(Continued)

OTHER PUBLICATIONS

Youtube video, HVAC ECM variable Speed Blower Motor to PSC Motor conversion, https://www.youtube.com/watch?v=6fYukoD8nr8 published on Jan. 30, 2016.*

(Continued)

*Primary Examiner* — Bickey Dhakal
(74) *Attorney, Agent, or Firm* — Michael W. O'Neill, Esq.

(57) ABSTRACT

A system and method are provided to allow the replacement of a costly electrically commutated blower or fan motor with a less efficient motor such as a permanent split capacitor motor operating at a predetermined speed, without regard to the specific electrically commutated motor command signals or programming being used by the original equipment manufacturer. A retrofittable control board is employed to activate the replacement motor by energizing the replacement blower motor when an electrically commutated blower motor command signal is observed on any one of the signal lines which are continuously monitored simultaneously.

6 Claims, 5 Drawing Sheets

(56) References Cited

U.S. PATENT DOCUMENTS

| | | | | |
|---|---|---|---|---|
| 2011/0181216 A1* | 7/2011 | Bass | .................. | H02P 6/28 |
| | | | | 318/400.11 |
| 2011/0260671 A1* | 10/2011 | Jeung | .................. | H02P 6/08 |
| | | | | 318/701 |
| 2012/0212166 A1* | 8/2012 | Merkel | ............... | F24F 11/0079 |
| | | | | 318/400.08 |
| 2016/0373035 A1* | 12/2016 | Yong | ................ | H02K 11/28 |

OTHER PUBLICATIONS

HVAC Service—X13 ECM to PSC Blower Motor Conversion, https://www.youtube.com/watch?v=eTfM8_Oa1HQ (Year: 2013).*

Geothermal University (Year: 2013).*

Azure Digi-Motor 2013 Motors & Amatures, Inc., (Brochures).

Rescure Select Motors, OEM Replacement for ECM Furnaces and Air Handlers (Brochures).

QwikSEER+ Theory of Operation and Retrofit Potential, Mainstream Engineering Corporation http://www.qwik.com/products/qwikseer/index.jsp Prepared by Robert P. Scaringe and R. Paul Roth; Mar. 2013.

QwikSwap™ Universal Constant Torque, ECM Blower Motor, An Aftermarket ECM Constant Torque Motor Replacement (Brochure).

\* cited by examiner

ELEGANTLY SIMPLE LOW-COST RETROFIT METHOD AND SYSTEM FOR REPLACING A CONSTANT TORQUE ELECTRONICALLY COMMUTATED MOTOR WITH A FIX-SPEED PERMANENT SPLIT CAPACITOR MOTOR

CROSS-REFERENCE TO RELATED APPLICATIONS

This application is related to an application entitled "Retrofit Device and Method to Improve Humidity Control of Vapor Compression Cooling Systems" filed by Robert P. Roth et al. on Jul. 13, 2012 and assigned application Ser. No. 13/548,828 and to an application entitled "Simple Low-Cost Retrofit Device And Method To Replace A Variable Air Flow Electronically Commutated Motor, etc." filed by Elliot L. Dana et al. on Mar. 2, 2016 and assigned application Ser. No. 15/058,313, the subject matter of which is incorporated by reference herein.

BACKGROUND AND SUMMARY OF THE INVENTION

Figure 1:
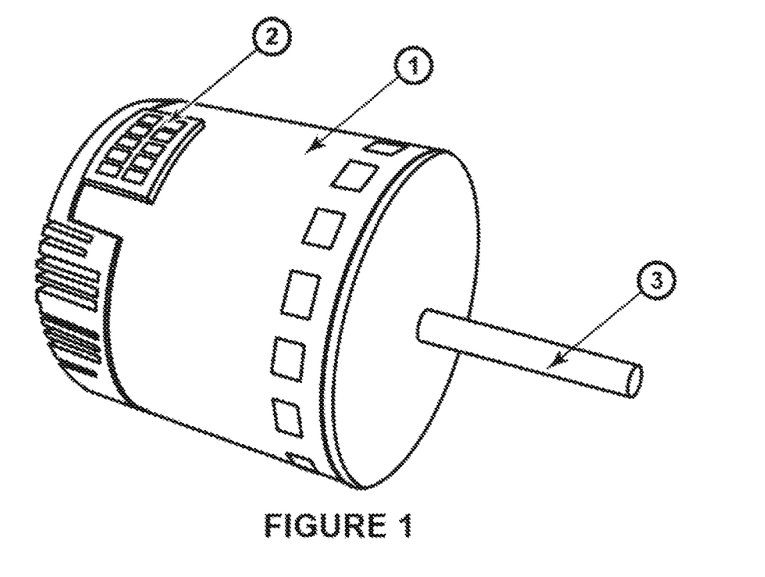
FIG. 1 is a schematic perspective view showing a constant torque ECM with the standard nine pin electrical connection and drive shaft.
Figure 2:
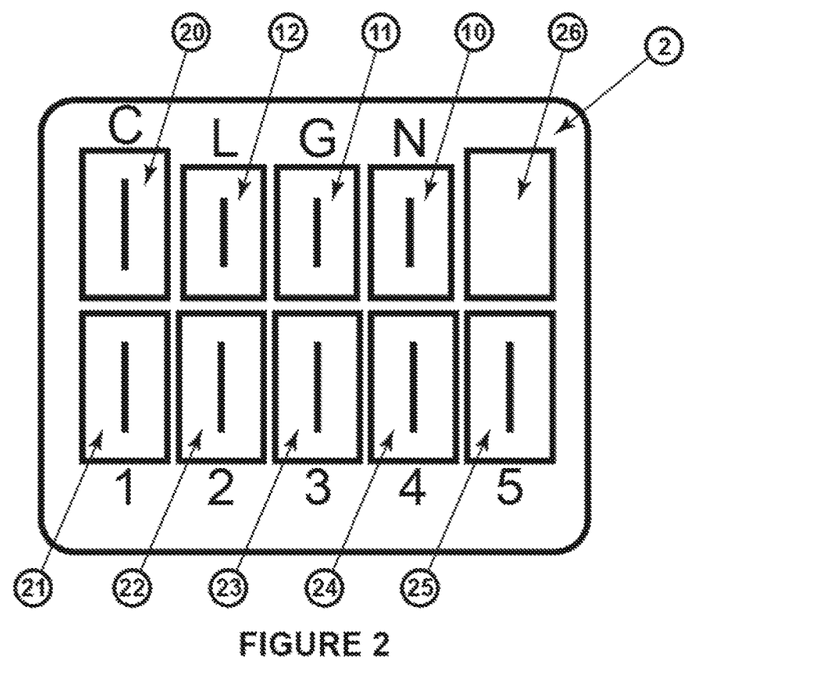
FIG. 2 is an enlarged view of the standard electrical connection used on the blower constant torque ECM shown in FIG. 1.

The present invention relates generally to an elegantly simple, low-cost electronic control to allow a constant torque Electronically Commutated Motor (ECM) of the type shown in FIG. 1 to be replaced with a less expensive permanent split capacitor (PSC) indoor air handler blower motor or the like operating at a single fixed speed determined by the installer. The typical problem with attempting to make such a change of motor types is that these variable air flow rate systems have proprietary and manufacturer unique methods of commanding the motor to operate at a particular air flow. Traditional 24 VAC low-voltage thermostats utilize a 24 VAC analog control wire (typically color coded Green), along with a common wire, to activate a relay which when closed provides high-voltage (such as 120/240 VAC) power to the blower motor. However, constant torque ECMs are instead supplied with nine standard connections laid out in two rows as shown in FIG. 2 and consisting of two line voltage connections (which always supply power to the motor) as well as a ground wire labeled G and a low-voltage common on the first row. Normally, the cooling and heating blower motor torque settings for the Constant Torque ECM are determined by the location of the cooling and heating low voltage control wires on the five low voltage connections on the second row. Activation of a specific control wires with a low voltage signal activates the motor at the predetermined torque setting.

While the connectors on the indoor air handler blower constant torque ECM have been standardized, the function of each of the five pins on the lower connector which determine the ECM torque setting is a programmable feature, and each Original Equipment Manufacturer (OEM) programs the torque setting for each pin differently and commonly may not even use all the pins. These motors customarily have five possible torque settings but the correlation of a particular connection on the five-pin connector and the actual torque setting is determined by the unique programming of the OEM and not by the motor manufacturer. These constant torque ECMs are normally programmed by the OEM manufacturer to run at an unspecified but constant torque, making it difficult for the repair technician to replace the motor with anything other than an exact replacement. Due to the large number of manufacturers and the different sizes of air conditioning units, it is unlikely that a repair technician would have an exact motor replacement at the service site, making return trips to the repair location and delays inevitable. Nidec Motor Corporation of St. Louis, Mo., for example, offers a replacement blower ECM under the brand RESCUE™ Select™ to serve as a drop-in replacement for constant torque ECMs. Mars Motors and Armatures, Inc. has developed the "Azure Digi-Motor" to replace the constant torque ECM by using external static air pressure to program the correct operating horsepower for the particular application A PSC motor is a fixed-speed, asynchronous motor that operates on alternating current power. PSC motors used in air conditioner or heat pump indoor air handlers usually have between three and five speed taps. These speed taps are connection points for electrical power and determine the blower speed. When installing a residential air conditioning system with a PSC motor, the HVAC technician typically selects the blower speed and thus indirectly an air flow rate by connecting the power input to one of the speed taps. While the blower motor speed is constant, airflow is not constant because airflow is dictated by both blower speed and pressure drop. That is, the air flow will change as the air filter becomes dirty (increasing pressure drop) or for different installations in which a pressure drop is due to the installation-specific duct work design. PSC motors are typically the least expensive and most reliable motor because they do not require the complicated electronics necessary in an ECM motor.

A constant torque ECM is a brushless, direct current (DC) motor with an internal microprocessor that manages commutation, resulting in a constant torque output. In addition to being more efficient than PSC motors, the constant torque capability results in a more constant airflow over a wider range of pressure drops in duct work. That is, the constant torque ECM can deliver a more constant airflow even while air filter configuration and cleanliness or ducting geometries change. Although a constant torque motor does not provide constant air flow rate, the constant torque ECM provides a more constant air flow when compared to the PSC motor. In other words, changes in pressure drop have less of an effect on the air flow rate of an ECM compared to a PSC motor. Equipment manufacturers appear to like the constant torque ECM because they can be assured of more constant air flow over a wider range of ductwork pressure drops (such as installation errors or ductwork design errors), making the performance of their units less susceptible to these difficult-to-predict installation errors. They may also like these ECMs because they can be custom programmed by the air conditioner or heat pump manufacturer, thereby making it more difficult for a field repair technician to use a generic motor.

U.S. Pat. No. 6,282,910 proposes using an AC induction blower motor along with a variable speed drive, where alternating current power is directly coupled to the motor at nominal line frequency for full speed operation, or an inverter output is used to alter blower speed when reduced blower speed is desired. Although the existing alternating current (AC) induction motor is used, a continuously variable speed drive inverter is required to vary the motor speed.

Others have proposed modulating the compressor speed (see, e.g., U.S. Pat. No. 7,946,123), but these known approaches also required variable speed drive inverters or different compressors to implement in a retrofit configuration that is both costly and impractical. Likewise, U.S. Pat. No. 7,739,882 discloses a variable speed control system for use with a variable speed compressor. Calibration techniques have been developed for calibrating and controlling variable speed motors as shown, for example, in U.S. Pat.

No. 4,860,231 which discloses a technique to determine the ECM motor settings to achieve a desired predetermined constant air flow rate (CFM) for the blower motor. The load torque acting on the blower wheel is determined by way of a "coast down" procedure in which the motor is briefly de-energized and the rate of angular change is determined. The load torque acting of the blower wheel can be then determined using the moment of inertial and the rate of angular change. The average motor RPM is then related to a torque value when an RPM vs. CFM relationship has been predetermined for the specific blower wheel. A microprocessor then computes the final motor RPM necessary to achieve a desired air delivery CFM using the fan law equations.

Significantly, the present invention uses the existing multi-speed selection capability of fixed speed air handler blower motors such as a PSC motor combined with an installer to select the proper speed to use, to provide a lower cost alternative to replacing a failed constant torque blower ECM with another such blower motor. Fixed-speed PSC blower motors typically have several different winding combinations that give the HVAC installer the ability to select from an assortment of fixed speeds from the same blower motor (depending on the speed tap that is activated), to best balance the air flow for a particular installation. Once the speed is selected by the installer, the air handler blower operates at this speed whenever the motor is activated. Typical PSC air handler blower motors have three to five speeds as above noted. Of course, our invention could also be used with a replacement motor that only operates at a single speed. However, for multi-speed tap replacement motors, the blower speed is typically selected by placing the power-leads on the quick-disconnect post that correlates to the desired blower speed or connecting the power-leads to specific electrical wires originating from the motor and are differentiated by color. Once a speed is selected, the air handler blower will operate at the selected speed whenever it is powered in that mode.

U.S. Pat. No. 7,191,607 discloses a speed control that selectively operates the fixed speed blower motor to slow the speed of the blower for dehumidification but only in the initial stages of the cooling mode, typically the first 5 to 7 minutes.

Mainstream Engineering Corporation, the assignee of the present application, has in the past developed and marketed retrofit boards to achieve a variety of performance-enhancing purposes. For example, U.S. Pat. No. 9,207,001 discloses such a control board that reduces an evaporator blower's speed as long as there is a negligible change in the compressor's power compensation so as to obtain a net increase in COPc. This product is marketed under the trademark "QwikSEER.+®"

The "QwikSEER+®" control reduces the power draw of an AC or heat pump by modulating evaporator airflow. On air conditioning or heat pump systems with traditional analog thermostats, the QwikSEER+® control board automatically selects the blower speed from one of the possible PSC motor speeds. For PSC blower motors, changes in the system pressure drop, caused by such things as a dirty air filter, will make a more dramatic change to the airflow. Unlike typical digital thermostat variable speed system installations, which have complicated and costly ECM motor power electronics, Mainstream's QwikSEER+® blower control module automatically accounts for changing installation and environmental conditions each time the cooling mode is activated and does so with a lower-cost PSC motor configuration. QwikSEER+ WattSaver® control board uses simple relays to turn a reliable, inexpensive fixed-speed PSC motor into a three-speed motor, yielding much of the benefit provided by a variable-speed ECM motor (which optimizes airflow with environmental changes) at a fraction of the cost and with potentially improved reliability. When the system starts in cooling mode, QwikSEER+® operates the PSC blower motor in different speeds, compares system operating conditions for the different fan speeds, and determines the optimal fan speed to maximize performance. This flexibility allows QwikSEER+® to optimize air handler blower speed while accounting for all system conditions: outdoor air temperature, indoor air temperature and humidity, supply ducting restrictions, and air filter type and status. Unlike a variable-speed ECM motor with a digital thermostat, QwikSEER+® does not have complicated digital control electronics or complicated power electronics, which can increase and potentially lower the reliability. QwikSEER+® can be installed in an existing system with a PSC motor and analog thermostat to enhance efficiency and humidity removal. QwikSEER+® along with a PSC motor can also be installed in any system with a failed ECM or other motor that uses an analog thermostat but the installer would have to rewire the system to create a low-voltage output to activate the Qwik-SEER+® control board. For example, QwikSEER+® literature has stated that "if a homeowner has a blown Constant-Torque style ECM motor such as an X-13 motor, the technician can add a contactor to be activated by the thermostats Green and Common low voltage controls wires and then run power leads from the QwikSEER+® board to the PSC motor." If the system was used for both heating and cooling, then two contactors would be needed to isolate the two circuits, to avoid back-feeding of the heating control circuit from the blower activation control voltage being supplied. Once sales of QwikSEER+® began, Mainstream Engineering Corporation came to realize that a technical understanding of the way to properly rewire the low-voltage control circuit and to prevent back-feeding was either beyond most technicians' understanding or technicians were unwilling to spend the time necessary to perform this rewiring on a service call. This approach also required the installer to identify the high voltage power leads and ground lead on the ECM motor connector and rewire these power leads and ground to the QwikSEER+® control board.

More recently, to avoid the need for the installer to rewire the control circuit, and the power circuit while also avoiding the electrical back feeding issue which became a common issue during field rewiring of the control board by many technicians, Mainstream began marketing QwikSWAP™ which is a retrofittable control board to replace a failed constant torque ECM with a PSC motor using the speed optimization logic of the QwikSEER+® patent while avoiding the need for any circuit rewiring. The QwikSWAP™ control has the advantage over the earlier QwikSEER+® approach when replacing a failed ECM motor because now it is only necessary to move the constant torque ECM power and control circuit leads from the universal connection on the failed ECM to the QwikSWAP™ board and then run the power leads from that board to the PCS motor and install a capacitor. It is not necessary to add contactors to the existing circuitry or even understand the existing circuitry. This greatly simplifies the replacement of the ECM motor since it avoids any complex or major circuit rewiring to activate the control board and the PSC motor. Both QwikSEER+® and QwikSWAP™ boards control the speed of a PSC motor in the exact same way to optimize efficiency, reduce energy consumption, and dramatically improve humidity removal.

They also both have an optional humidity sensor to further improve humidity removal. The difference between these two products is mainly one of installation ease. With QwikSEER+®, if a homeowner has a blown constant-torque style ECM, the technician must add at least one contactor to be activated by the thermostat's Green and Common low voltage control wires, run line power directly from the molded plug connected to the ECM motor being replaced (or from some other power source) to the QwikSEER+® board, and then run the power leads from the QwikSEER+® board to the PSC motor and wire in a capacitor. Using a QwikSWAP™ control board instead of the QwikSEER+® board simplifies the installation, because it is only necessary to move all the constant torque ECM leads (power and control wires) from the universal connection on the blown ECM to the QwikSWAP™ board and then run the power leads from the QwikSWAP™ board to a PSC motor and wire in a capacitor. QwikSWAP™ saves time and money while also reducing the need to add one or more contactors.

With the board of the present invention, wiring is also further simplified; again the installer need only move all the constant torque ECM leads (power and control wires) from the universal connection on the blown ECM to the control board of the present invention and then run the power leads from the control board to a PSC motor and wire in a capacitor. However, in this case, when the evaporator blower is activated, the blower speed is set to whatever speed was selected by the installer, and the speed setting does not change. More specifically, the present invention allows the installer to select a desired motor speed by connecting a power lead from the control board to the desired speed tap of a replacement motor including even a single speed replacement motor. All possible low-voltage terminals on all possible low voltage control lines normally routed to the ECM being replaced are simultaneously monitored. Any signal on any of the possible control lines can then be used to activate the replacement motor.

A goal of the present invention, therefore, is to provide a universal blower motor replacement that is a motor that is completely independent of a specific OEM manufacturer's programming, and lowers cost while employing a commonly available PSC blower motor or the like instead of a OEM replacement motor or replacement ECM. Because of the much higher cost of the ECM, the lower cost PSC motor, even though less efficient, has market appeal. An additional benefit of the present invention is to allow simple repair installation when an installer must replace a failed blower ECM, since the installer does not need to speculate or guess about the proper wiring of the replacement motor because our invention will operate the PSC motor at the installers desired speed setting, regardless of the how the original ECM was programmed by the OEM.

Therefore, another goal of our invention is to make it easy for a field repair technician to use a generic PSC motor to replace the customized OEM ECM without having to know or understand the OEM custom motor programming. The present invention is elegant in its simplicity and ability to provide a simple low cost replacement for ECMs while replacing a specific OEM uniquely programmed ECM without having to determine the OEM specific motor programming. The motor change is accomplished without replacing the existing thermostat-based control system and without adding a complex, and costly alternative controller. Due to its simplicity, the present invention can be easily and quickly retrofitted into exiting air conditioning and heat pump cooling systems in the form of a control board and a PSC motor to replace the existing ECM.

The control board of the present invention has an output lead and common which are connected to the desired speed tap of the multi-speed tap blower motor or in the case of a single speed motor to the only power tap and the common power connection. The control board microprocessor of our currently preferred embodiment of the present invention is powered by scavenging power from the input control leads, that is from 1,2,3,4, or 5 and C (FIG. 2). If the optional R terminal is connected (FIG. 6) control power can also be obtained from R and C if desired. The remainder of the air conditioning or heat pump control system is unchanged.

In a typical air conditioning or heat pump applications, when the thermostat on the air conditioning or heat pump system calls for cooling, power is supplied to the compressor(s), the condenser fan(s) and the evaporator blower(s) and one or more 24 VAC control signals from the thermostat are used to activate the system. In the currently preferred embodiment of the present invention, the replacement PSC blower motor is activated by any one of the control wires that had been connected to one of the five terminals (and the common) of the constant torque ECM and is now connected (along with the common) to the control board of the present invention. When the thermostat is calling for heating, a 24 VAC heating control signal which has been rerouted from the replaced constant torque ECM to the control board of the present invention also activates the replacement PSC blower motor. If desired, a time delay circuit to keep the replacement blower motor operating after the control circuit has called for turning the motor off can be used to remove any residual heat or cooling capacity from the system. Likewise, a time delay circuit to keep the replacement blower motor from starting after the control circuit has called for activating the motor can be used to allow the system to heat up or cool down before flowing any air across the heat transfer surfaces in the blower motor section of the system.

BRIEF DESCRIPTION OF THE DRAWINGS

These and other features, advantages and objects of the present invention will become more readily apparent from the following detailed description when taken in conjunction with the accompanying drawings wherein.

DETAILED DESCRIPTION OF THE DRAWINGS

FIG. 1 shows the standard electrical connections on a constant torque ECM (1) with the standard nine-pin constant torque ECM power and control connection (2) and drive shaft (3) which is connected to the blower. The replacement control board (100 in FIG. 3) of the present invention can be located either inside or outside the air handler, within practical reach to the blower motor (indoor air handler motor). The control board can be powered and controlled by the line voltage and control voltage signals that were originally connected to, say, an original OEM constant torque ECM. A constant torque blower ECM (1) characteristically has the same connection pattern (2) as shown in more detail in FIG. 2. To simplify retrofit wiring, the control board (100) of the present invention has the same electrical connection pattern shown in FIG. 2 located directly on the control board designated as 2' on control board (100) shown in FIG. 3.

Referring again to FIG. 2 which is an enlarged view of the standard electrical connection (2) used on all constant torque blower ECMs, where (21)-(25) represent different preprogrammed torque selection electrical connection tabs, 120 VAC or 208/240 VAC electrical line power is supplied to Terminals L (12) and N (10), Terminal G (11) is the ground terminal, terminal C (20) is the 24 VAC Common Terminal and Spacer (26) is provided to prevent accidental improper installation of the connector.

Figure 3:
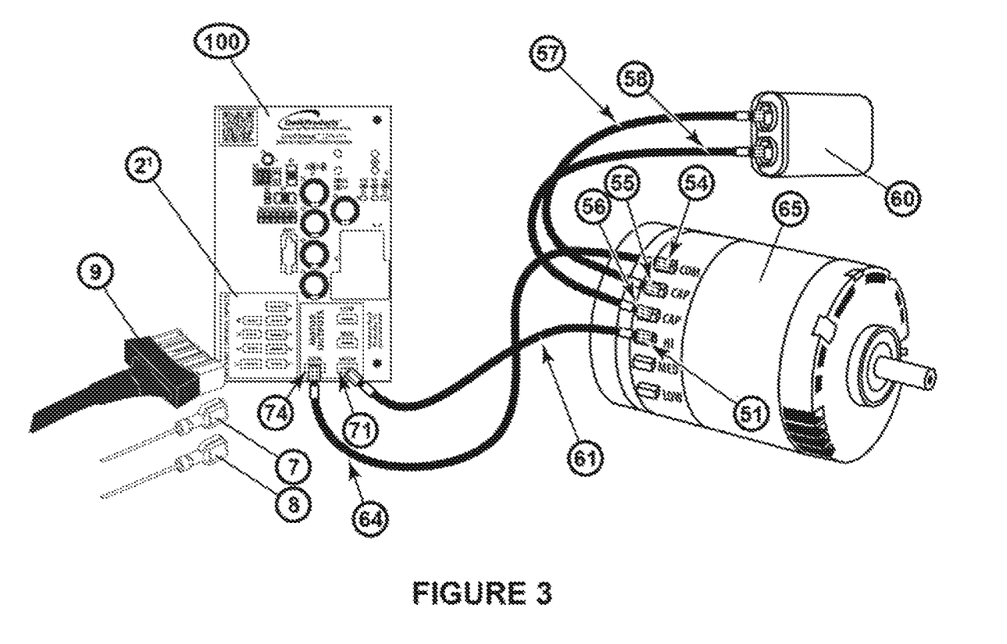
FIG. 3 is a wiring connection diagram showing the control board and the location of the connections for the wires from the constant torque ECM shown in FIG. 1 and the location of the wires going to the PSC motor according to one embodiment of the present invention.

FIG. 3 is a diagram showing the how the control board (100) and PSC motor (65) are connected. To simplify retrofit wiring, the control board (100) has the same electrical connection pattern shown in FIG. 2 located directly on the control board designated as 2' on control board (100). In a currently preferred embodiment of the present invention, the control board (100) has the nine connections of the typical constant torque ECM consisting of two line voltage connections L and N (FIG. 2) as well as a ground wire labeled G and a low-voltage common. Normally, the cooling and heating blower motor torque settings for the constant torque ECM motor are determined by the location of the cooling and heating low voltage control wires on the five low voltage connections. All the input power and control connections are removed from the constant torque motor being replaced and attached to the corresponding location on the control board (100) of the present invention. The PSC motor is also connected to a capacitor 60 that has been sized for the particular horsepower of the PSC motor being used. The 4-pin standard connector (9) is removed from the constant torque ECM being replaced and inserted into the similar location on the similar looking connection (2') on the control board (100). The low voltage control wires that activate the proper ECM motor torque for heating (7) and cooling (8) are removed from the constant torque ECM being replaced and inserted into the similar pin location on the similar looking connection (2') on the control board (100). The PSC motor (65) which is replacing the constant torque ECM is wired to the control board (100) by routing a common wire (64) from the common post (74) of the control board (100) to the common post (54) of the PSC motor (65). Similarly, a wire (61) connects to the single selected speed tab, either the high speed tab (51) of the PSC motor (65), the medium speed tab (52) of the PSC motor (65), or the low speed tab (53) of the PSC motor (65). Two wires (57, 58) connect the capacitor (60) to the PSC motor (65).

Figure 4:
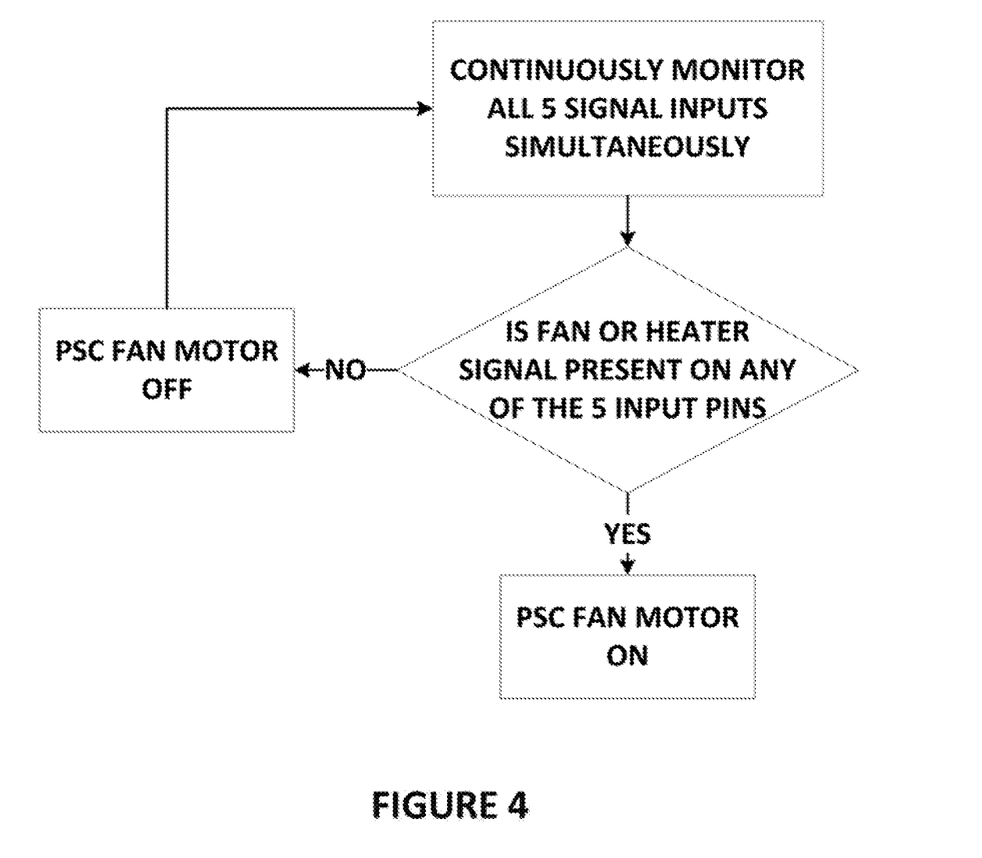
FIG. 4 is a control logic diagram showing how the present invention is used for a heat pump or air conditioning cooling unit, where the indoor blower PSC motor is operated at a single speed selected by the installer by attaching the power lead to one of the PSC motor speed taps.

Referring to FIG. 4, the PSC blower is started, via a control signal being sent to any one of the five connectors on the constant torque ECM connector (and common) that was removed from the replaced ECM. The PSC blower motor is operated at the speed selected by the installer, by supplying line power either 120 VAC or 208/240 VAC to the selected power tap on the PSC blower motor located on the indoor air handler.

No information needs to be stored when the control board (100) is not being activated by a heating or cooling control signal. There is also no need to know the OEM programmed logic or which of the five control connectors should be monitored by the control board, since all low-voltage pins are diode-isolated (to prevent back feeding of an active circuit to one of the other circuits and resulting in unanticipated events such as activating both heating and cooling simultaneously) but connected with circuitry to provide the exact same function, namely providing power to the installer-selected speed tap and common (or to the power connections of a single speed motor). No specific OEM constant torque setting or OEM motor programming is used to determine the proper air flow for the system; rather this is determined by the installer's location of the power leads placement on the replacement multi-speed tap PSC motor or by selection of the properly sized single speed PSC motor. This is an ideal low cost and simple PSC motor replacement for failed constant torque replacement blower motor applications.

The inventive concept is, of course, not limited to only replacing ECMs, or using PSC motors as the replacement, but can easily be extended to replacing any type of motor including any form of ECM including variable air flow ECMs.

Our inventive concept is also not limited to using only a replacement PSC motor. The blower control could instead provide power to one of the torque taps on a generic constant torque ECM instead of one of the speed taps on a PSC motor.

Our invention will work for any vapor compression cooling or refrigeration system where the energy flow to the evaporator or condenser is controlled by a fan or blower motor or a fluid pump.

Our novel approach can also be extended to the outdoor condenser fan, if the condenser ECM was replaced with the control board of the present invention and a motor including but not limited to a single-speed motor, multi-speed tap PSC motor or multi-torque tap ECM.

While the previous discussion related to air conditioners and heat pumps, the present invention can also be used where a vapor compression heat pump or air conditioner is used with a gas, oil or electric furnace. Such an arrangement is generally discussed in U.S. Pat. No. 4,648,551 where an ECM is used as the blower motor for air delivery in both heating and cooling operation.

The foregoing describes examples of the various ways available to one skilled in the art as a method to employ the present invention to provide a preselected blower air flow. One skilled in the art would be able to use our invention with a wide assortment of blower or condenser motors both in cooling or heating mode.

Figure 5:
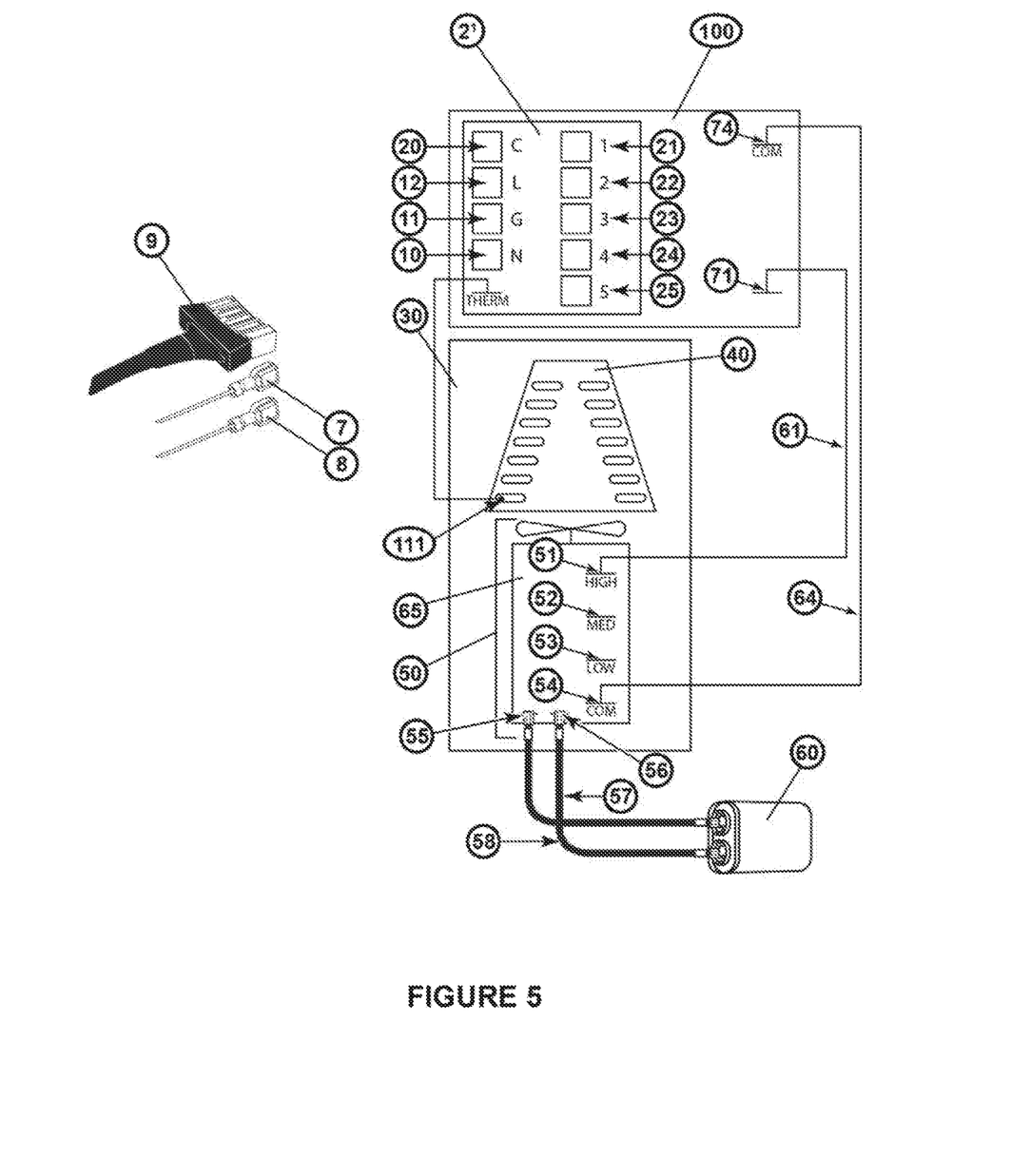
FIG. 5 schematically shows one contemplated implementation of the preferred embodiment of the control board or device of the present invention when retrofitted on the indoor air handler of a heat pump or air conditioning system.

FIG. 5 schematically shows a currently contemplated implementation of the above-described currently preferred embodiment of the proposed control board or device (100) when retrofitted on the air handler (30) of a heat pump or air conditioning system. The power leads and heating and cooling control leads normally connected to the standard constant torque ECM connection are moved to like locations on the control board. This includes the power leads (10, 12), ground lead (11), and 24 VAC common lead (20). The power leads along with the 24 VAC common are typically connected via a single molded plug (9) which contains the power leads (10, 12), the ground (11) and the 24 VAC common lead (20). The 24 VAC control leads for motor torque settings (of the constant torque ECM that is being replaced) in heating (7) and cooling (8) were each connected to one of the five possible torque settings on the connector (2) of the replaced ECM shown in FIG. 1 and are now connected to the like locations on the similar looking connector (2') on the control board labeled (21, 22, 23, 24, 25). The specific connection is originally determined by the specific programming used by each particular system manufacturer when using the original ECM that is being replaced. A preselected blower motor speed tap is energized when an electrically commutated blower motor command signal is observed on any one of the signal lines which are continuously monitored simultaneously.

Because the present invention allows the installer to decide on the proper blower air flow and does not rely on the specific connection location or the manufacturers' torque selection in the replaced ECM, the specific connection point, that is any of the five would be equivalent, however, to simplify the effort by the installer our control board provides all five connection locations to allow the installer to simply connect to the exact same labeled connection point. As stated earlier, these connection points are all connected together (and diode isolated to prevent improper interconnections back to the thermostat), but the exact connection terminal has no bearing on the operation of our invention.

One of ordinary skill will contemplate other implementations given the foregoing disclosure of the control logic and basic approach of the present invention. The control board (100) is then connected to a PSC motor (65), by connecting the blower motor electrical connection (71) to one of the speed taps, High (51), Medium (52), or Low (53) on the PSC motor as well as a common wire (64) to connect to the motor common (54). The PCS motor (65) is part of the blower assembly (50) and requires the use of a capacitor (60) wired to the appropriate capacitor connections (55, 56) on the PSC motor (65)) using wires (57, 58). The blower assembly (50) moves air through the air handler (30) and through the indoor coil (40).

Figure 6:
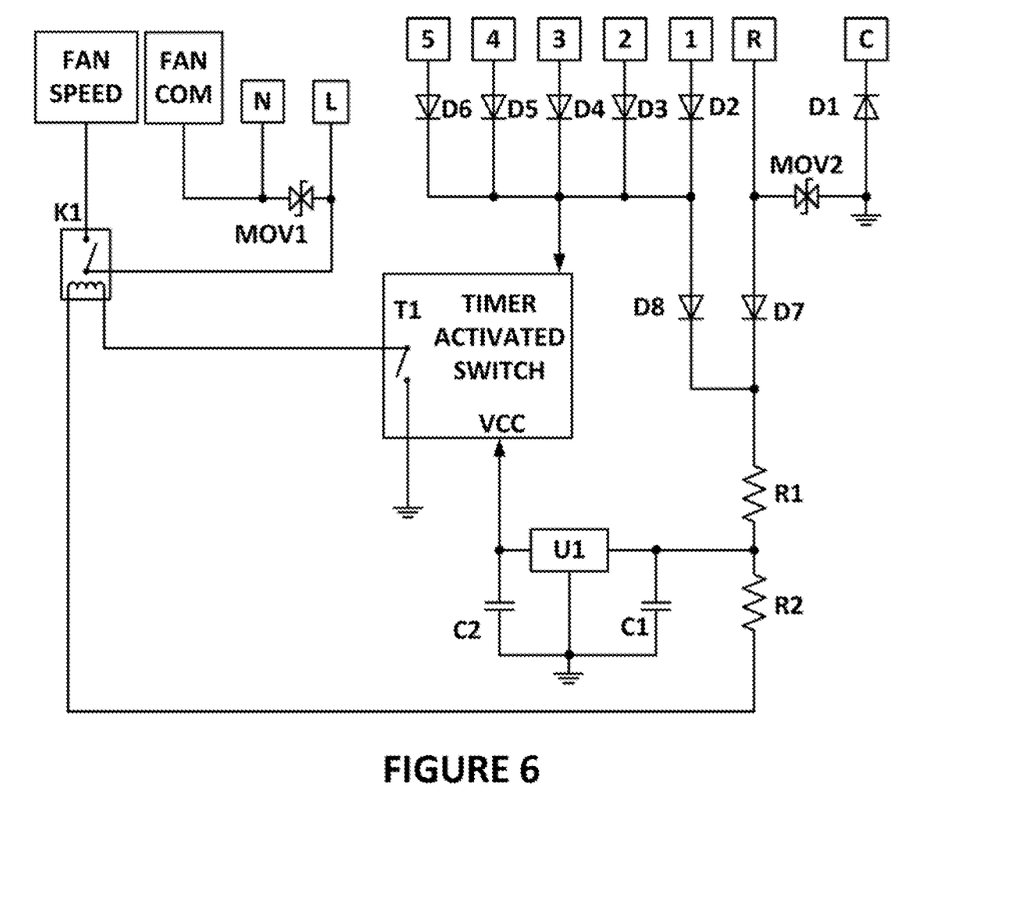
FIG. 6 is an electrical schematic of the control board of the currently preferred embodiment of the control board of the present invention installed in the indoor blower motor power circuit of a heat pump or air conditioning system.

FIG. 6 is an electrical schematic of one currently contemplated embodiment of the electronic controller board, including a one shot timer T1 which activates relay K1, and a low voltage power supply (U1, D1-D8, C1, C2, R1, R2). The power supply (U1, D1-D8, C1, C2, R1, and R2) is a simple, conventional power supply capable of interfacing between the 24 VAC control voltage and the logic level voltage needed to run the low voltage electronics.

Of course one skilled in the art can make modifications to the board shown in FIG. 6. For example, one may replace the power supply (U1, D1-D8, C1, C2, R1, R2) with a wide number of different voltage regulation/conversion modules, switching power supplies, or circuits for the same functional purpose of providing a logic-level voltage and power output to the controller. Likewise, one skilled in the art could power the electronics with a high voltage power supply derived from the fan input power (120/240 VAC). Relay K1 could be replaced with a solid state switching device such as a triac or back-to-back SCRs.

While we have shown and described several embodiments in accordance with the present invention, it should be clearly understood that the same is susceptible to even further modifications without departing from the scope of the appended claims. Therefore, we do not intend to be limited to the details shown and described herein but intend to cover all changes and modifications that fall within the scope of the appended claims.

We claim:

1. A control board for a thermostat-based control split vapor-compression system having an evaporator with an associated blower and an electronically commutated motor (ECM), the ECM having an electrical connection that represents different preprogrammed torque selection tabs that receive at least two low voltage control wires from the thermostat-based control split vapor-compression system, a 120 VAC electrical line power, a 208/240 VAC electrical line power, a ground terminal, and a 24 VAC common terminal, the control board allows replacement of the ECM with a permanent split capacitor (PSC) motor having a common post and at least one speed tab, the control board comprising:
   an electrical connection pattern that correlates to the electrical connection that represents the different preprogrammed torque selection tabs, the 120 VAC electrical line power and the 208/240 VAC electrical line power, the ground terminal, and the 24 VAC common terminal on the ECM;
   a common post to receive a common wire coming from the common post on the PSC motor;
   at least one single selected speed tab to receive a wire connected to the at least one speed tab on the PSC motor;
   a one shot timer that activates a relay on the control board and a low voltage power supply on the control board; and
   wherein the low voltage power supply provides a logic-level voltage to the low voltage control wires that are from the thermostat-based control split vapor-compression system.

2. A control board for a split vapor compression system having an indoor coil with an associated blower and an electronically commutated motor (ECM), the ECM having an electrical connection that represents different preprogrammed torque selection tabs that receive at least two low voltage control wires from the thermostat-based control split vapor-compression system, a 120 VAC electrical line power, a 208/240 VAC electrical line power, a ground terminal, and a 24 VAC common terminal, the control board allows replacement of the ECM with a permanent split capacitor (PSC) motor having a common post and at least one speed tab, the control board comprising:
   an electrical connection pattern that correlates to the electrical connection that represents the different preprogrammed torque selection tabs, the 120 VAC electrical line power and the 208/240 VAC electrical line power, the ground terminal, and the 24 VAC common terminal on the ECM;
   a common post to receive a common wire coming from the common post on the PSC motor;
   at least one single selected speed tab to receive a wire connected to the at least one speed tab on the PSC motor;
   a one shot timer that activates a relay on the control board and a low voltage power supply on the control board; and
   wherein the low voltage power supply provides a logic-level voltage to the low voltage control wires that are from the split vapor-compression system.

3. A control board for a thermostat-base controlled vapor compression air conditioning system or heat pump system, wherein the system having a compressor, and outdoor heat exchanger coil with an associated outdoor coil fan, an indoor heat exchanger coil associated with an indoor coil blower and an electronically commutated motor (ECM), the ECM having an electrical connection that represents different preprogrammed torque selection tabs that receive at least two low voltage control wires from the thermostat-based control split vapor-compression system, a 120 VAC electrical line power, a 208/240 VAC electrical line power, a ground terminal, and a 24 VAC common terminal, the control board allows replacement of the ECM with a permanent split capacitor (PSC) motor having a common post and at least one speed tab, the control board comprising:
- an electrical connection pattern that correlates to the electrical connection that represents the different preprogrammed torque selection tabs, the 120 VAC electrical line power and the 208/240 VAC electrical line power, the ground terminal, and the 24 VAC common terminal on the ECM;
- a common post to receive a common wire coming from the common post on the PSC motor;
- at least one single selected speed tab to receive a wire connected to the at least one speed tab on the PSC motor;
- a one shot timer that activates a relay on the control board and a low voltage power supply on the control board; and
- wherein the low voltage power supply provides a logic-level voltage to the low voltage control wires that are from the split vapor-compression system.

4. A control board in a vapor compression air conditioning system or heat pump system having a compressor, an outdoor heat exchanger coil and an associated outdoor coil fan with an outdoor electronically commutated motor (ECM), the outdoor ECM having an electrical connection that represents different preprogrammed torque selection tabs that receive at least two low voltage control wires from the thermostat-based control split vapor-compression system, a 120 VAC electrical line power, a 208/240 VAC electrical line power, a ground terminal, and a 24 VAC common terminal, the control board allows replacement of the outdoor ECM with a permanent split capacitor (PSC) motor having a common post and at least one speed tab, the control board comprising:
- an electrical connection pattern that correlates to the electrical connection that represents the different preprogrammed torque selection tabs, the 120 VAC electrical line power and the 208/240 VAC electrical line power, the ground terminal, and the 24 VAC common terminal on the ECM;
- a common post to receive a common wire coming from the common post on the PSC motor;
- at least one single selected speed tab to receive a wire connected to the at least one speed tab on the PSC motor;
- a one shot timer that activates a relay on the control board and a low voltage power supply on the control board; and
- wherein the low voltage power supply provides a logic-level voltage to the low voltage control wires that are from the split vapor-compression system.

5. A control board for an air conditioning system having an indoor heat exchanger coil associated with an indoor coil blower and an indoor electronically commutated motor (ECM), the indoor ECM having an electrical connection that represents different preprogrammed torque selection tabs that receive at least two low voltage control wires from the thermostat-based control split vapor-compression system, a 120 VAC electrical line power, a 208/240 VAC electrical line power, a ground terminal, and a 24 VAC common terminal, the control board allows replacement of the ECM with a permanent split capacitor (PSC) motor having a common post and at least one speed tab, the control board comprising:
- an electrical connection pattern that correlates to the electrical connection that represents the different preprogrammed torque selection tabs, the 120 VAC electrical line power and the 208/240 VAC electrical line power, the ground terminal, and the 24 VAC common terminal on the ECM;
- a common post to receive a common wire coming from the common post on the PSC motor;
- at least one single selected speed tab to receive a wire connected to the at least one speed tab on the PSC motor;
- a one shot timer that activates a relay on the control board and a low voltage power supply on the control board; and
- wherein the low voltage power supply provides a logic-level voltage to the low voltage control wires that are from the split vapor-compression system.

6. A control board for a thermostat-based system having an evaporator with an associated blower and an electronically commutated motor (ECM), the ECM having an electrical connection that represents different preprogrammed torque selection tabs that receive at least two low voltage control wires from the thermostat-based control split vapor-compression system, a 120 VAC electrical line power, a 208/240 VAC electrical line power, a ground terminal, and a 24 VAC common terminal, the control board allows replacement of the ECM with a permanent split capacitor (PSC) motor having a common post and at least one speed tab, the control board comprising:
- an electrical connection pattern that correlates to the electrical connection that represents the different preprogrammed torque selection tabs, the 120 VAC electrical line power and the 208/240 VAC electrical line power, the ground terminal, and the 24 VAC common terminal on the ECM;
- a common post to receive a common wire coming from the common post on the PSC motor;
- at least one single selected speed tab to receive a wire connected to the at least one speed tab on the PSC motor;
- a one shot timer that activates a relay on the control board and a low voltage power supply on the control board; and
- wherein the low voltage power supply provides a logic-level voltage to the low voltage control wires that are from the split vapor-compression system.

\* \* \* \* \*